United States Patent
Hayes et al.

(10) Patent No.: US 6,250,639 B1
(45) Date of Patent: Jun. 26, 2001

(54) IDLER ROLL WET SEAL

(75) Inventors: Douglas Hayes, Fayetteville, GA (US); B. Shane Kelley, Tupelo; Charles F. East, Van Vleet, both of MS (US)

(73) Assignee: FMC Corporation, Chicago, IL (US)

( * ) Notice: Subject to any disclaimer, the term of this patent is extended or adjusted under 35 U.S.C. 154(b) by 0 days.

(21) Appl. No.: 09/229,525

(22) Filed: Jan. 13, 1999

(51) Int. Cl.⁷ .............. F16J 15/54; F16J 15/32; B65G 39/00
(52) U.S. Cl. .......... 277/350; 277/565; 198/501
(58) Field of Search .................. 277/346, 350, 277/351, 551, 562, 565, 572, 575

(56) References Cited

U.S. PATENT DOCUMENTS

| | | | |
|---|---|---|---|
| 3,399,589 | * 9/1968 | Breed | 411/428 |
| 3,606,351 | 9/1971 | Hallerback | 277/565 X |
| 4,277,114 | * 7/1981 | Lindegger | 384/144 |
| 4,373,759 | 2/1983 | Greener et al. | 384/480 |
| 4,972,939 | * 11/1990 | Uttke et al. | 198/501 |
| 5,028,054 | * 7/1991 | Peach | 277/350 X |
| 5,188,214 | * 2/1993 | Uttke et al. | 198/501 |
| 5,261,528 | * 11/1993 | Bouchal | 198/842 |
| 5,957,461 | * 9/1999 | Ulrich | 277/569 |

FOREIGN PATENT DOCUMENTS 2 650 047    4/1991   (FR) .

* cited by examiner

Primary Examiner—Anthony Knight
(74) Attorney, Agent, or Firm—Pauley Petersen Kinne & Fejer

(57) ABSTRACT

This invention relates to a seal for protecting an end of an idler roll against contaminants. The seal includes a fastener engageable with the end of the idler roll and an integral first sealing member molded onto the fastener and extending radially outward from the fastener. A second sealing member is integrated with the first sealing member. The first sealing member and the second sealing member project into frictional engagement with the end of the idler roll. When assembled with the end of the idler roll, the first sealing member and the sealing member are biased into frictional engagement with the end of the idler roll, thus protecting the end of the idler roll from contaminants in wet environments.

13 Claims, 2 Drawing Sheets

IDLER ROLL WET SEAL

BACKGROUND OF THE INVENTION

1. Field of the Invention

This invention relates to a seal for protecting an idler roll from contaminants found in wet environments.

2. Description of Prior Art

Idler rolls are used for conveying material, supplies and/or production components in various industrial applications such as material handling, storage and/or manufacturing. Idler rolls typically comprises a tube rotatably joined to a fixed support at each end of the tube. At least one bearing is positioned within the tube to enable smooth rotation of the tube. The tubes and bearings are typically constructed from steel. Such steel components are susceptible to corrosion and contamination, specifically when used in damp environments.

A series of idler rolls are arranged to comprise a conveyor that transports material through the rotation of the idler rolls. The effectiveness of the conveyor is severely reduced when one or more idler rolls freeze up due to corroded components. Therefore a seal for protecting the idler rolls from corrosion and contamination is desirable.

SUMMARY OF THE INVENTION

A seal for an end of the idler roll according to this invention includes a fastener that is engageable with the end of the idler roll. A first sealing member having a top surface and a bottom surface is preferably molded onto the fastener and extends radially outward from the fastener. The seal additionally includes a second sealing member. The second sealing member is molded into the first sealing member and preferably extends from the bottom surface of the first sealing member. When the seal is assembled with the idler roll, the first sealing member and the second sealing member preferably project into frictional engagement with the end of the idler roll.

Preferably, the seal further includes a flange that projects from an underside of the fastener and extends circumferentially around the fastener. When the seal is assembled with the idler roll, the flange is preferably seated within a portion of the end of the idler roll. As a result, the flange creates a close clearance labyrinth seal, thus protecting the idler roll in the event of deterioration of both the first sealing member and the second sealing member.

A lubricant, such as water resistant grease, may be inserted between the bottom surface of the first sealing member and the idler roll. The lubricant reduces friction and wear on the seal and fills the gap between the seal and the end of the idler roll thus preventing entry of water and other contaminants.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 3:
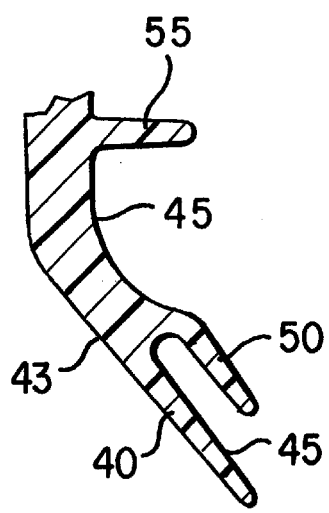
FIG. 3 is an enlarged view of a first sealing member, a second sealing member and flange shown in FIG. 2.
Figure 4:
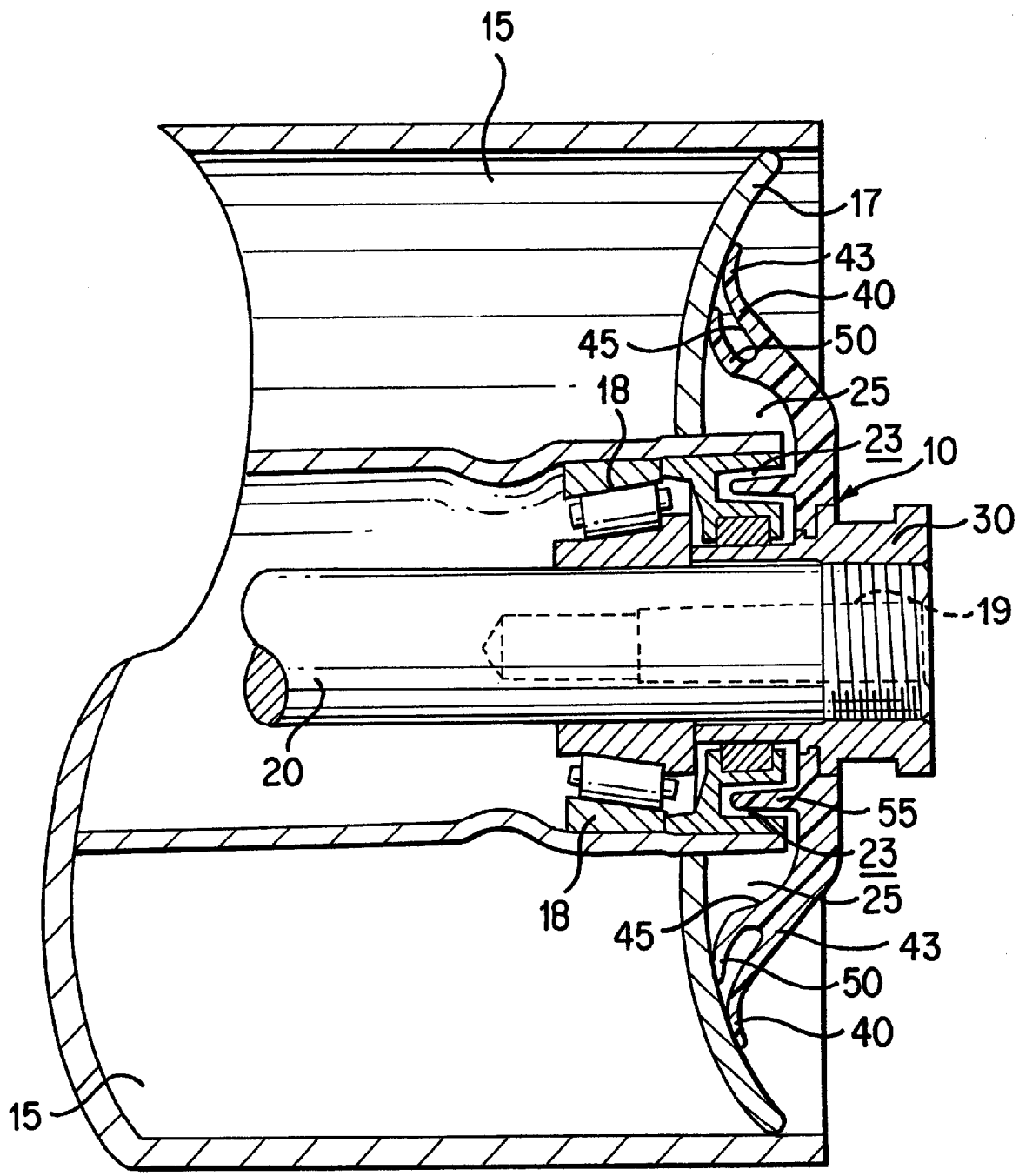
FIG. 4 is a sectional view showing the engagement between a seal and an idler roll according to one preferred embodiment of this invention.

FIGS. 1–4 show seal 10 for protecting idler roll 15 from contaminants, specifically contaminants such as slurries and sprays found in wet environments. As shown in FIG. 4, idler roll 15 typically comprises end 17, bearing 18 and shaft 20 having threaded end 19. Bearing 18 preferably enables idler roll 15 to rotate smoothly about shaft 20. Prior art bearings became contaminated with moisture or wet materials, causing them to freeze up, resulting in slowed, uneven or no rotation of associated idler rolls. In accordance with the present invention, bearing 18 is sealed against contaminants to prevent malfunction of idler roll 15.

Figure 1:
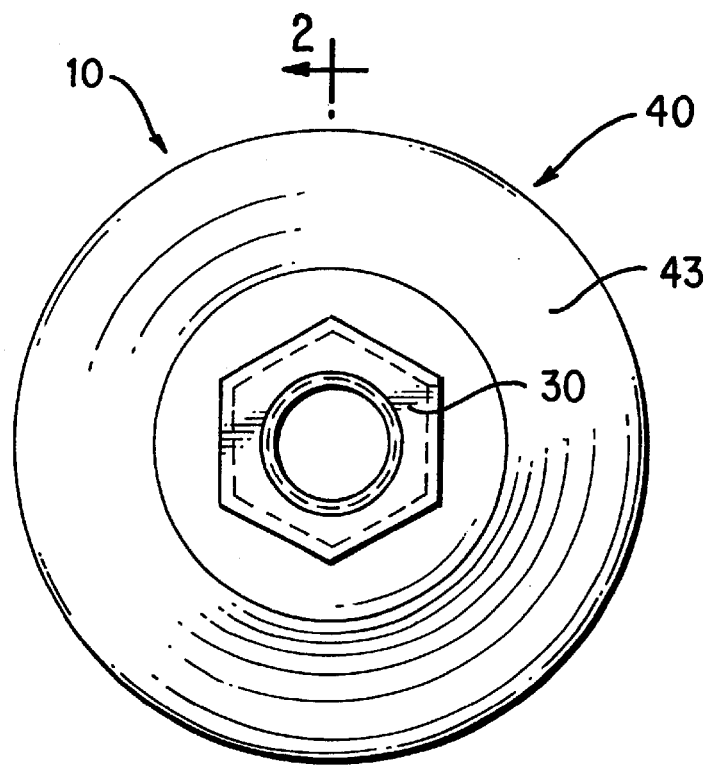
FIG. 1 is a top view of the seal according to one preferred embodiment of this invention.
Figure 2:
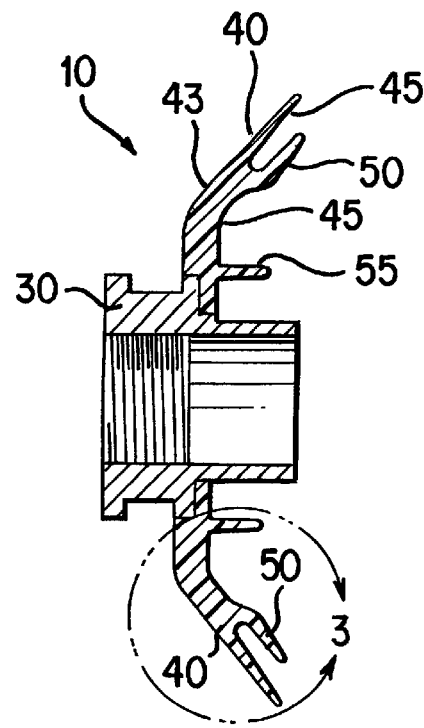
FIG. 2 is a sectional view of the seal shown in FIG. 1.

As shown in FIG. 1, seal 10 includes fastener 30, preferably at an approximate center of seal 10. Fastener 13 may be a nut, washer or other component engageable with end 17 of idler roll 15. In one preferred embodiment of this invention shown in FIGS. 1–4, fastener 30 is a threaded nut engageable with threaded end 19 of shaft 20.

First sealing member 40 is preferably molded onto fastener 30. First sealing member 40 may be insert molded, injection molded or otherwise attached to fastener 30 to comprise a unitary, single-piece seal 10. First sealing member 40 should be attached to fastener 30 in such a manner as to prevent relative movement of first sealing member 40 with respect to fastener 30. First sealing member 40 extends radially outward from fastener 30 and preferably is circular to correspond with end 17 of idler roll 15.

As shown in FIGS. 1–4, first sealing member 40 includes top surface 43 and bottom surface 45. Top surface 43 faces away from idler roll 15 when seal 10 is assembled with idler roll 15. Bottom surface 45 faces toward idler roll 15 and preferably curves toward idler roll 15.

As a result of the preferred configuration of seal 10, when seal 10 is assembled with idler roll 15, first sealing member 40, specifically bottom surface 45, projects into frictional engagement with end 17 of idler roll 15. In one preferred embodiment of this invention, first sealing member 40 deforms when in frictional engagement with idler roll 15. Such deformation ensures a sealed engagement between first sealing member 40 and end 17 of idler roll 15.

As shown in FIGS. 1–4, seal 10 additionally includes second sealing member 50. Second sealing member 50 is preferably molded or otherwise integrated into first sealing member 40 to comprise a single, unitary seal 10. In one preferred embodiment of this invention, second sealing member 50 extends from bottom surface 45 of first sealing member 40. As shown in FIG. 3, second sealing member 50 may project from bottom surface 45 approximately halfway along a radius of first sealing member 40. When seal 10 is assembled with idler roll 15, second sealing member 50 is preferably additionally biased into frictional engagement with end 17 of idler roll 15. Preferably, first sealing member 40 and second sealing member 50 each eliminate radial clearance between seal 10 and end 17 of idler roll 15.

In one preferred embodiment of this invention, seal 10 further includes flange 55 extending circumferentially around fastener 30 and projecting from an underside of fastener 30. Flange 55 preferably has a larger inner diameter than an outer diameter of fastener 30. As shown in FIG. 4, when seal 10 is assembled with idler roll 15, flange 55 is preferably seated within corresponding channel 23. As a result, flange 55 creates a close clearance labyrinth seal with idler roll 15. In the event of deterioration of both first sealing member 40 and second sealing member 50, flange 55 will maintain an effective close clearance seal from contaminants.

According to one preferred embodiment of this invention, first sealing member 40, second sealing member 50 and flange 55 are molded from polyurethane. Other suitable materials exhibiting flexibility, water resistance and wear resistance may be substituted for polyurethane in the manufacture of seal 10.

Preferably, fastener 30, first sealing member 40, second sealing member 50 and flange 55 together form an integrated, single-piece seal 10. Such a single-piece configuration avoids the requirement for inventories of multiple new or replacement parts when installing, repairing or replacing seals 10 on idler rolls 15.

In one preferred embodiment of this invention, lubricant 25 is inserted between bottom surface 45 of first sealing member 40 and idler roll 15. Lubricant 25 preferably comprises a water resistant grease or other material known to those having ordinary skill in the art which exhibits similar qualities. Lubricant 25 not only reduces friction and wear between seal 10 and end 17 of idler roll 15, but also fills the gap between bottom surface 45 of seal 10 and end 17 of idler roll 15 thereby preventing entry of water and other contaminants. Therefore, lubricant 25 performs the additional function of further sealing end 17 of idler roll 15 from water and other contaminants. As lubricant 25 escapes from within seal 10, the possibility for contamination of idler roll 15 may increase, therefore lubricant 25 is preferably maintained at optimum quantities within seal 10.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of the invention.

We claim:

1. A seal for protecting an end of an idler roll against contaminants comprising:
   a threaded end of a shaft extending from within the idler roll;
   a fastener engageable with the threaded end of the shaft;
   a first sealing member molded onto the fastener, the first sealing member having a top surface and a bottom surface and extending radially outward from the fastener and projecting into frictional engagement with the end of the idler roll;
   a second sealing member extending from the bottom surface of the first sealing member generally parallel with the first sealing member and into fricitional engagement with the end of the idler roll, wherein the first sealing member and the second sealing member are biased against the end of the idler roll as the fastener is tightened with respect to the threaded end of the shaft; and
   a flange extending circumferentially from a bottom of the first sealing member.

2. The seal of claim 1 wherein the flange has a larger inner diameter than an outer diameter of the fastener.

3. The seal of claim 1 further comprising a lubricant inserted between the bottom surface of the first sealing member and the idler roll.

4. The seal of claim 3 wherein the lubricant is a water resistant grease.

5. The seal of claim 1 wherein the first sealing member is polyurethane.

6. The seal of claim 1 wherein the idler roll further comprises a threaded end extending from a shaft within the idler roll.

7. The seal of claim 6 wherein the fastener is engageable with the threaded end of the shaft.

8. The seal of claim 6 wherein the first sealing member is biased against the end of the idler roll as the fastener is tightened with respect to the threaded end of the shaft.

9. A seal for protecting an end of an idler roll against contaminants comprising:
   a threaded end of a shaft extending from within the idler roll;
   a fastener, the fastener engageable with the threaded end of the shaft;
   a first sealing member extending radially outward from the fastener and projecting into frictional engagement with the idler roll;
   a second sealing member extending from the first sealing member generally parallel with the first sealing member and into frictional engagement with the idler roll, wherein the first sealing member and the second sealing member are biased against the end of the idler roll as the fastener is tightened with respect to the threaded end of the shaft; and
   A flange extending circumferentially and generally perpendicular from a bottom of the first sealing member, wherein the first sealing member, the second sealing member and the flange together form an integrated, single-piece seal.

10. The seal of claim 9 further comprising a lubricant inserted between a bottom surface of the first sealing member and the idler roll.

11. The seal of claim 10 wherein the lubricant comprises a water resistant grease.

12. The seal of claim 9 wherein the fastener is a nut.

13. The seal of claim 12 wherein the first sealing member is molded onto the nut.

* * * * *